US011316553B2

(12) United States Patent
Roden, III et al.

(10) Patent No.: US 11,316,553 B2
(45) Date of Patent: Apr. 26, 2022

(54) RADIO FREQUENCY CLOCKED DEVICE

(71) Applicant: Raytheon BBN Technologies, Corp., Cambridge, MA (US)

(72) Inventors: Thomas Gilbert Roden, III, New Windsor, MD (US); John-Francis Mergen, Baltimore, MD (US); Christopher Michael Wilder, Pikesville, MD (US); David Brian Miller, Jr., Washington, DC (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 0 days.

(21) Appl. No.: 16/833,356

(22) Filed: Mar. 27, 2020

(65) Prior Publication Data

US 2021/0250059 A1    Aug. 12, 2021

Related U.S. Application Data

(60) Provisional application No. 62/986,549, filed on Mar. 6, 2020, provisional application No. 62/971,649, filed on Feb. 7, 2020.

(51) Int. Cl.
*H04B 1/7073* (2011.01)
*H04L 7/033* (2006.01)

(52) U.S. Cl.
CPC ......... *H04B 1/7073* (2013.01); *H04L 7/0331* (2013.01); *H04L 7/0332* (2013.01); *H04B 2201/7073* (2013.01)

(58) Field of Classification Search
CPC .......... H04B 1/7073; H04B 2201/7073; H04L 7/0331; H04L 7/0332

USPC .................. 375/131–133, 140, 145; 455/557
See application file for complete search history.

(56) References Cited

U.S. PATENT DOCUMENTS

| 5,333,176 A * | 7/1994 | Burke ............... H04M 1/72409 |
| | | 455/557 |
| 7,589,909 B2 * | 9/2009 | Ikeda ..................... G02B 15/17 |
| | | 359/688 |
| 10,466,655 B1 | 11/2019 | Matsumoto |
| 2003/0219082 A1 * | 11/2003 | Tanaka .................... H03J 1/005 |
| | | 375/324 |

(Continued)

OTHER PUBLICATIONS

International Search Report for International Application No. PCT/US2020/063641 dated Mar. 23, 2021, 11 pages.

*Primary Examiner* — Fitwi Y Hailegiorgis

(57) ABSTRACT

An RF clocked device can include a signal processor operable to receive an RF signal having an RF signal frequency and output a clock signal having a clock frequency based on the RF signal frequency. The RF clocked device can also include a clock operable to receive, and operate, using the clock signal. The clock can output at least one of a time and a date. In addition, a clock system can include an RF clocked device. The RF clocked device can include a signal processor operable to receive an RF signal having an RF signal frequency and output a clock signal having a clock frequency based on the RF signal frequency. The RF clocked device can also include a clock operable to receive, and operate, using the clock signal. The clock can output at least one of a time and a date. The clock system can also include a client device operable to receive timing information from the RF clocked device.

48 Claims, 5 Drawing Sheets

(56) References Cited

U.S. PATENT DOCUMENTS

| | | | |
|---|---|---|---|
| 2007/0133501 A1* | 6/2007 | Park | G04G 9/0076 |
| | | | 370/350 |
| 2009/0168849 A1* | 7/2009 | Rouxel | H04J 13/00 |
| | | | 375/140 |
| 2013/0295843 A1* | 11/2013 | Tian | H04B 5/0025 |
| | | | 455/41.1 |
| 2015/0236667 A1* | 8/2015 | Kitsunezuka | H03H 11/12 |
| | | | 327/557 |
| 2016/0306048 A1 | 10/2016 | Dunn et al. | |

* cited by examiner

RADIO FREQUENCY CLOCKED DEVICE

RELATED APPLICATIONS

This application claims the benefit of U.S. Provisional Application No. 62/971,649, filed Feb. 7, 2020, and U.S. Provisional Application No. 62/986,549, filed Mar. 6, 2020, which applications are incorporated by reference herein in their entirety.

GOVERNMENT LICENSE RIGHTS

This invention was made with government support under contract no. 70RSAT18CB0000024 awarded by the Department of Homeland Security. The government has certain rights in the invention.

BACKGROUND

Reliable time data is essential for the correct operation of various systems, such as the power grid, industrial controls, process controls, emergency services, military systems, banking, and financial markets. Currently, these systems depend substantially upon the presence of Global Positioning System (GPS) signals for obtaining accurate and reliable time. If a malicious attack or natural event (such as sun spot activity) disrupts GPS, these dependent systems could fail with potentially catastrophic national security, human safety, and economic consequences.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
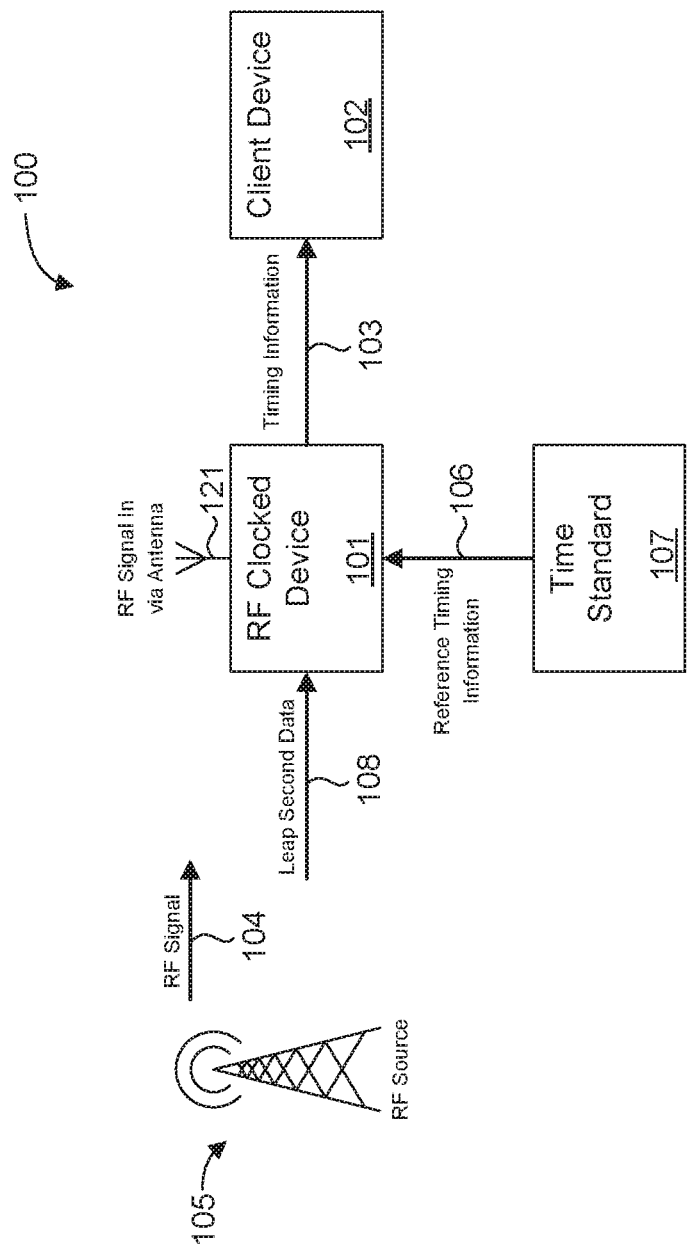
FIG. 1 is an illustration of a clock system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

As mentioned above, GPS is vulnerable to disruption. Although other time standard signals are available that provide time and date information, these are relative few in number and may provide relatively weak signals (e.g., due to distance from broadcast source) to a location in need of accurate time and date information.

Accordingly, a radio frequency (RF) clocked device is disclosed that can maintain precise timing using common, terrestrial radio signals without the need for those signals to contain any time and date information. In one aspect, such RF signals may be high-power signals that facilitate operation in RF-attenuated environments where lower-power signals would be unavailable. The RF clocked device can include a signal processor operable to receive an RF signal having an RF signal frequency and output a clock signal having a clock frequency based on the RF signal frequency. The RF clocked device can also include a clock operable to receive, and operate, using the clock signal. The clock can output at least one of a time and a date.

In one aspect, a clock system can include an RF clocked device. The RF clocked device can include a signal processor operable to receive an RF signal having an RF signal frequency and output a clock signal having a clock frequency based on the RF signal frequency. The RF clocked device can also include a clock operable to receive, and operate, using the clock signal. The clock can output at least one of a time and a date. The clock system can also include a client device operable to receive timing information from the RF clocked device.

Figure 2:
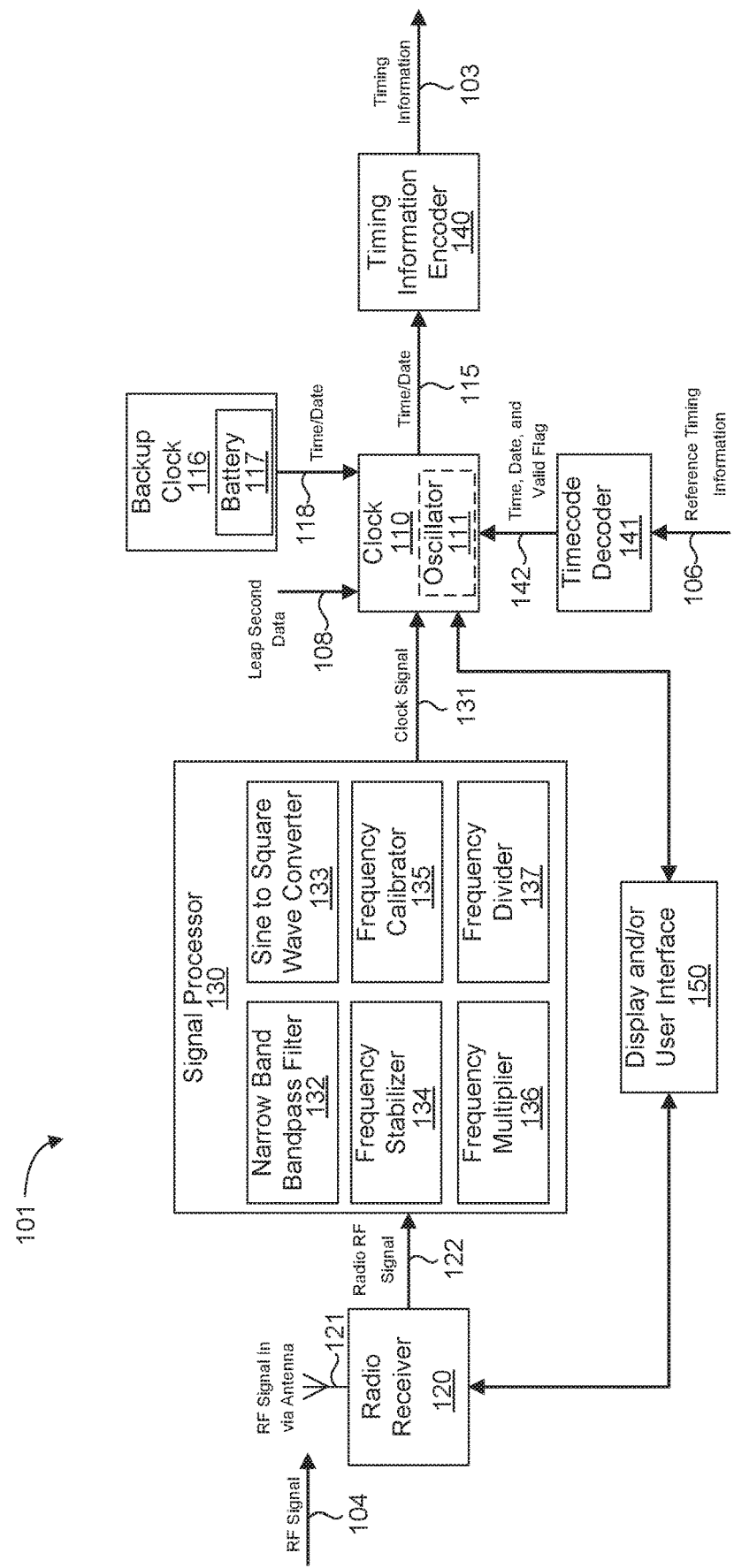
FIG. 2 is an illustration of a radio frequency (RF) clocked device of the clock system of FIG. 1, in accordance with an example of the present disclosure.

To further describe the present technology, examples are now provided with reference to the figures. With reference to FIG. 1, various aspects of a clock system 100 are illustrated. The clock system 100 can comprise a radio frequency (RF) clocked device 101 and a client device 102 operable to receive timing information 103 from the RF clocked device 101. Certain more detailed aspects of the RF clocked device 101 are illustrated in FIG. 2. In general, the RF clocked device 101 can utilize any suitable RF signal 104 (typically from a terrestrial RF source 105) to operate an internal clock 110 (e.g., using the frequency of the RF signal 104 as a timing mechanism for the clock 110). Ideally, the RF signal 104 is a strong, stable signal but any signal of opportunity (SOOP) can be utilized. The RF clocked device 101 can be configured to output timing information 103 based on time and/or date information generated by the clock 110. A client device 102 can be any suitable device, system, or component that utilizes timing information 103. For example, the RF clocked device 101 can be used to provide timing information for military applications, banking, financial markets, transportation, power grid, industrial process control, first responders, world-wide precision timing systems, or any other application that can utilize timing information.

In one aspect, the RF clocked device 101 can be operable to receive and utilize a signal containing reference timing information 106 (e.g., a GPS signal) to synchronize the clock 110 with a time standard 107 while such a signal is available. Any suitable and available time standard or reference timing information can be utilized. In one example, the reference timing information 106 can be provided by the Global Positioning System (GPS), which typically includes timing information (e.g., precise time and date) in a GPS signal. In one aspect, the RF clocked device 101 (e.g., the clock 110) can be synchronized with reference timing information 106, if available, upon powering of the RF clocked device 101, thus "initializing" the RF clocked device 101 (e.g., the clock 110) with an accurate time and date. The RF clocked device 101 can be synchronized with a time standard 107 (e.g., with reference timing information received from a GPS signal) at any suitable time or interval. In one aspect, such synchronizations can occur periodically (e.g., at one second intervals) to maintain the RF clocked device 101 in close agreement with the time standard 107 while reference timing information 106 is available. Thus, under normal conditions, the accuracy of the timing information 103 provided to the client device 102 can be essentially identical to the timing information the client device 102 would receive directly from the time standard 107. In the event that the time standard 107 becomes unavailable (e.g., due to signal interference, etc.), the RF clocked device 101 can continue to operate as usual using the RF signal 104 to operate the internal clock 110 and generate timing information 103 for the client device 102. However, with no available reference timing information 106, there would of course be no synchronizing with the time standard 107. In other words, if reference timing information 106 (e.g., a GPS signal) becomes unavailable, the only difference in operation of the RF docked device 101 is that the clock 110 is not synchronized with the time standard 107 (e.g., the GPS clock). Thus, the RF clocked device 101 can continue generating and outputting accurate timing information 103 to the client device 102 without any interruption in service (e.g., no "switch over" from one time source to a backup time source) regardless of the availability of reference timing information 106 from a time standard 107. The RF clocked device 101 can therefore provide a "hot-spare" backup when reference timing information 106 from a time standard 107 is unavailable (e.g., in a GPS-denied environment). In one aspect, information related to the location of nearby radio or television transmitters for use by the RF clocked device 101 can be stored to aid in finding a viable RF signal 104 for use by the RF clocked device 101 if a previously selected RF signal becomes unavailable.

The reference timing information 106 may be encoded in a standardized format known in the art. Thus, in one aspect, the RF clocked device 101 can include a timecode decoder 141 for decoding the reference timing information 106 from the standardized format into data this is usable by the RF clocked device 101. Thus, the timecode decoder 141 can be configured based on the format(s) of the timecode(s) that may provide the reference timing information 106. The timecode decoder 141 can read the timing information 106 and decode the timing information 106 into separate components representing the accurate time according to the time standard 107. The timecode decoder 141 can send this information to the clock 110 with a valid flag 142 so the clock 110 knows the exact moment when the timecode decoder 141 provided a valid time. In one example, the timecode decoder 141 comprises an Inter-Range Instrumentation Group (IRIG) standard format decoder, such as standard IRIG-B format with IEEE-1344 extensions, which is the timecode standard format provided by GPS. IRIG standard 200-04 is incorporated herein by reference in its entirety. The IRIG-B format or timecode is a serial data stream that includes the current date/time as well as a time quality metric called the timing figure of merit (TFOM), thus providing a high degree of system compatibility and ease of integration with existing infrastructure.

In one aspect, the clock 110 can comprise a real time clock (RTC), which can be any suitable RTC known in the art (typically a computer clock in the form of an integrated circuit) that can maintain the current date (e.g., day, month, and year) and time (e.g., hours, minutes, and seconds). In one aspect, as illustrated in FIG. 2, the RF clocked device 101 can include a backup clock 116 operable to provide at least one of an initial time and date 118 to the primary clock 110 upon startup of the RF clocked device 101 in the absence of reference timing information 106 from the time standard 107. The backup clock 116 can be any suitable RTC known in the art that can maintain the current date (e.g., day, month, and year) and time (e.g., hours, minutes, and seconds). The backup clock 116 can include, or receive power from, a battery 117 to locally maintain battery-backed current time to restore operation after a power failure without the need for an external time source such as the time standard 107. As with the primary clock 110, the backup clock 116 can be periodically synchronized with the time standard 107 and/or the primary clock 110 while such sources are available to maintain accurate time in the backup clock 116.

In one aspect, the RF clocked device 101 can include a radio receiver 120 operable to receive a wireless transmission of an RF signal 104 for use by the RF clocked device 101. In some examples, the RF clocked device 101 can include an antenna 121 operable with the radio receiver 120 to facilitate reception of RF signals 104. The RF clocked device 101 (e.g., the radio receiver 120 and/or the antenna 121) can be configured to receive a broad spectrum of signal types (e.g., HDTV, AM/FM, etc.) or a given frequency or frequency range. In one aspect, the RF clocked device 101 (e.g., the radio receiver 120) can be configured to select and lock onto the strongest signal available. The RF signal 104 received by the antenna 121 and the radio receiver 120 can be output from the radio receiver 120 as a radio RF signal 122 for processing as described in more detail below. The radio receiver 120 can be any radio device known in the art suitable for receiving the RF signal 104. The radio receiver 120 can be implemented as a hardware device, a software device (e.g., a software defined radio (SDR)), or a combination of hardware and software.

As mentioned above, the RF signal 104 has an RF signal frequency that can be used to operate the internal clock 110 of the RF clocked device 101. In general, any suitable RF signal (e.g., from 3 kHz to 300 GHz) can be utilized, although some signals have certain advantages, such as those provided by commercial radio and television stations. For example, widely available commercial radio and television station signals (e.g., HDTV, AM/FM, etc.) are often broadcast at high power and include a precise, continuous RF component that can provide a stable signal for operating the internal clock 110 of the RF clocked device 101. In a particular example, in accordance with Advanced Television Systems Committee (ATSC) standards, one component of an HDTV broadcast signal is a pilot signal (309.440559 kHz), which is used to synchronize an HDTV to the broadcast signal. This pilot signal is typically highly stable and precise and therefore a good candidate for a signal for operating the internal clock 110. As explained in more detail below, the RF clocked device 101 can extract the ATSC pilot signal from the strongest ATSC signal available for use in operating the clock 110. Using common, widely available RF signals, the RF clocked device 101 can generate a relative, frequency-based time reference that can be used to discipline its internal clock 110 without the RF signals containing any timing information (e.g., time and/or date). Thus, stable and accurate time keeping can be maintained without any external time reference inputs to the RF clocked device 101.

Although the RF signal 104 may include time information (e.g., time and/or date information or data), this or any other information provided by the RF signal is not needed or utilized by the RF clocked device 101 to operate the clock 110 using the RF signal 104. Instead, the RF clocked device can utilize the RF signal to synthesize a precision frequency-based time reference from a terrestrial RF signal, as described in more detail below. This stands in contrast to certain other approaches that may utilize terrestrial radio signals for keeping accurate time with a clock, but these approaches require the radio signals to contain time of day information, which is used to synchronize the clock. In addition, because the RF clocked device 101 can utilize any available RF signal, regardless of the actual information actually contained in the signal, the RF clocked device 101 can provide accurate timing information 103 even in RF-attenuated environments where lower-power signals may be unavailable. The RF clocked device 101 can therefore provide a GPS-independent approach to supplying a precision clock through the use of widely available, terrestrial RF signals.

In one aspect, the RF clocked device 101 can include a signal processor 130 operable to receive the radio RF signal 122 (e.g., from the radio receiver 110) and process the signal for use in operating the clock 110. In general, the signal processor 130 is operable to output a clock signal 131 (e.g., a timing reference for the clock 110) having a clock frequency based on based on, or derived from, the RF signal frequency. The clock 110 is operable to receive, and operate, using the clock signal 131. The clock signal 131, as provided to the clock 110, is in a configuration and condition suitable for operating the clock 110. For example, the clock signal 131 can comprise a series of pulses (e.g., a pulse train) at a given frequency that can serve as a timing reference for the clock 110.

In one aspect, the signal processor 130 can comprise a narrow band bandpass filter 132 so only a particular frequency of interest remains. The narrow-band feature of the filter pertains to the amount of signal that the filter allows to pass through it, such as from 1 Hz to 500 kHz. A bandpass filter only allows the center RF signal to pass through, called the passband. Frequencies above and below the passband signal are filtered. The filter roll off characteristic defines the responsiveness of the filter. In one aspect, the narrow band bandpass filter 132 can exhibit a sharp roll off. A filter of this type is beneficial to accurately receive RF signals that are a subcomponent or subchannel contained within a larger RF signal. For example, ATSC digital TV (DTV) is transmitted over a 6 MHz wide signal which has a pilot signal that is 309.440559 kHz wide. The narrow band bandpass filter 132 can be configured to allow only the frequency at 309.440559 kHz to pass to the next component. In other words, the narrow band bandpass filter 132 can filter out irrelevant information (e.g., the audio/visual data) to isolate a signal of interest, such as the pilot signal (309.440559 kHz).

There are two basic types of RF filters: an infinite impulse response (IIR) filter and a finite impulse response (FIR) filter. IIR and FIR filters can be implemented in both hardware and software. In one example, an IIR filter may be used for a hardware implementation of the narrow band bandpass filter 132. In another example, a FIR filter may be used for a software instantiation of the narrow band bandpass filter 132. Any hardware and/or software filter implementation can be used as the narrow band bandpass filter 132 as long as it is able to operate on narrow band signals and is a bandpass filter. Any suitable narrow band bandpass filter type or combination of filters known in the art can be utilized the narrow band bandpass filter 132, such as a Butterworth filter or a Chebyshev filter. A Butterworth filter blocks frequencies below and above the passband frequency range and is an IIR filter. A Butterworth filter is an attractive filter option because it has a frequency response that is maximally flat in the passband.

In one aspect, the signal processor 130 can comprise a sine to square wave converter 133 to convert a sine wave signal to a square wave signal, which can enable use of the signal in a digital system. Sine to square wave conversion can be accomplished utilizing any suitable process or technique known in the art. In one example, the sine to square wave converter 133 comprises zero crossing detection, which detects when the sine wave signal changes sign from positive to negative or vice-versa and defines a square wave having the same frequency as the sine wave. In other words, the resulting square wave is a pulse train or a series of pulses occurring at the frequency of the input sine wave.

In one aspect, the signal processor 130 can comprise a frequency stabilizer 134. The frequency stabilizer 134 provides stability to the signal by removing variation from the signal. Signals may include variations (e.g., jitter) that can affect the accuracy of the time output derived from the signal. Such variations may be introduced due to external factors involved in transmitting, propagation, and receiving the signal (e.g., wind blowing the broadcast antenna, signals reflecting off buildings or the ionosphere, etc.). In the case of the 309.440559 kHz HDTV pilot signal discussed above, even a small amount of jitter in such a signal with relatively low frequency may cause errors in timing accuracy. The frequency stabilizer 134 can utilize any suitable process or technique known in the art. In one example, the frequency stabilizer 134 can include a phase locked loop (e.g., all digital phase locked loop). The phase locked loop can include an integrating loop filter that "smooths out" frequency variation. Thus, any jitter in the input signal is "averaged out" over time enabling the phase locked loop to output a clean signal. A phase locked loop (e.g., all digital phase locked loop) can maintain the phase and frequency of the filtered signal to ensure that the phase and frequency of the signal does not deviate over time. The frequency stabilizer may be omitted if the input signal does not suffer from too much variation for a given application.

In one aspect, the signal processor 130 can comprise a frequency calibrator 135. The frequency calibrator 135 can compensate for the difference between a measured frequency of a signal and the nominal frequency of the signal, which can compensate for the tolerance of the incoming signal and variances (e.g., tolerance and drift) introduced by hardware in the RF clocked device 101. For example, a TV station may broadcast a pilot signal that varies slightly from the standard 309.440559 kHz signal (e.g., variation from the nominal frequency but still within the signal tolerance). Frequency calibration can ensure that the timing of the clock 110 remains accurate and doesn't drift overtime. In one aspect, the frequency calibrator 135 can compensate for jitter. The frequency calibrator 135 can utilize any suitable process or technique known in the art. In one example, the frequency calibrator 135 can comprise offset compensation (e.g., an offset from the nominal frequency of the signal) to calibrate a signal's frequency.

In one aspect, the signal processor 130 can comprise a frequency multiplier 136 and/or a frequency divider 137. Techniques such as frequency multiplication and frequency division can be utilized as desired, alone or in any combination with the signal processing techniques discussed above. For example, the frequency stabilizer 134 can perform frequency multiplication to multiply the signal frequency to a much higher frequency to achieve better resolution at the clock 110 and minimize the variations (e.g., jitter) in the signal. In the example of the 309.440559 kHz pilot signal, the frequency can be multiplied by a factor of 34, which is selected to enable the phase locked loop to lock onto the signal. The resulting output signal also has ~95 ns period, which compared to ~3.2 μs period of the 309.440559 kHz signal provides greater precision for the clock 110. Frequency multiplication and frequency division can utilize any suitable process or technique known in the art, such as a phase locked loop frequency multiplier or a phase locked loop frequency divider. When utilizing a phased locked loop frequency multiplier or a phase locked loop frequency divider, the frequency multiplier 136 or the frequency divider 137, as the case may be, can also serve as a frequency stabilizer.

Figure 3:
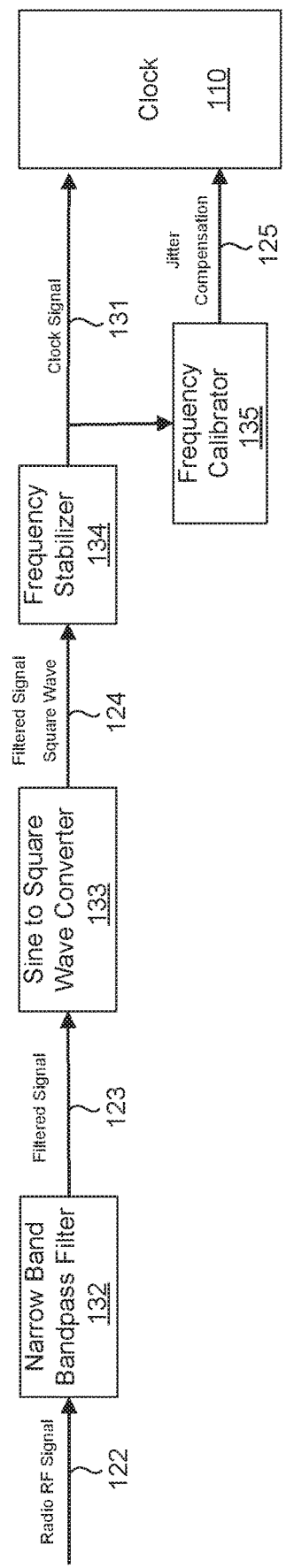
FIG. 3 is an illustration of a signal processor configuration of the RF clocked device of FIG. 2, in accordance with an example of the present disclosure.

The various components of the signal processor 130 described above can be arranged or grouped in any suitable manner to achieve a desired result. For example, as shown in FIG. 3, the narrow band bandpass filter 132 can receive the radio RF signal 122 and output a filtered signal 123 to the sine to square wave converter 133. The output of the sine to square wave converter 133 is a filtered signal square wave 124, which can be sent to the frequency stabilizer 134. The frequency stabilizer can output a clock signal 131, which is received by the clock 110. The clock signal 131 can also be sent to the frequency calibrator 135, which can output jitter compensation 125 to the clock 110. In one aspect, the jitter compensation 125 can be used to adjust a period of a subsecond timer of the clock 110 to ensure accuracy of calculations.

Figure 4:
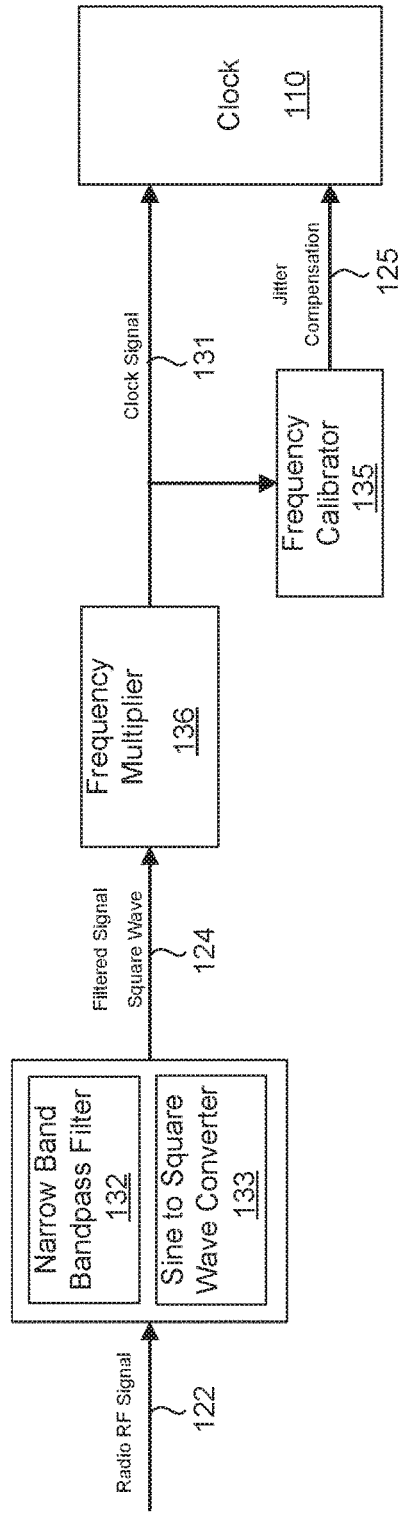
FIG. 4 is an illustration of a signal processor configuration of the RF clocked device of FIG. 2, in accordance with an example of the present disclosure.

In another example, shown in FIG. 4, the narrow band bandpass filter 132 and the sine to square wave converter 133 can be combined into a common component, which can receive the radio RF signal 122 and output a filtered signal square wave 124 to the frequency multiplier 136. The frequency multiplier 136 can output a clock signal 131 to the clock 110. In a particular example, the frequency multiplier 136 can be a phased locked loop frequency multiplier, which can also serve to stabilize the frequency of the signal. The clock signal 131 can also be sent to the frequency calibrator 135, which can output jitter compensation 125 to the clock 110.

Figure 5:
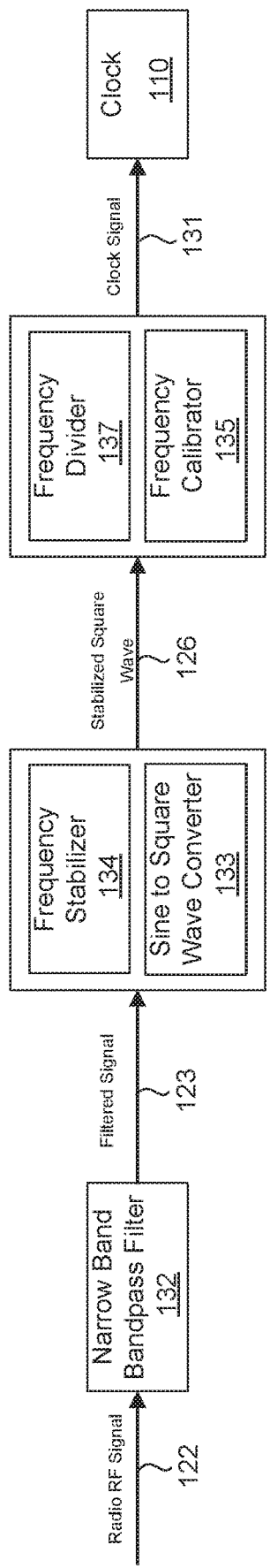
FIG. 5 is an illustration of a signal processor configuration of the RF clocked device of FIG. 2, in accordance with an example of the present disclosure.

In another example, shown in FIG. 5, the narrow band bandpass filter 132 can receive the radio RF signal 122 and output a filtered signal 123 to the frequency stabilizer 134 and the sine to square wave converter 133, which can be combined into a common component. The combined frequency stabilizer 134 and sine to square wave converter 133 component can output a stabilized square wave 126 to the frequency divider 137 and the frequency calibrator 135, which can also be combined into a common component. The combined frequency divider 137 and frequency calibrator 135 component can output a clock signal 131 to the clock 110. In a particular example, the frequency divider 137 can be a phased locked loop frequency divider, which can also serve to stabilize the frequency of the signal.

Figure 6:
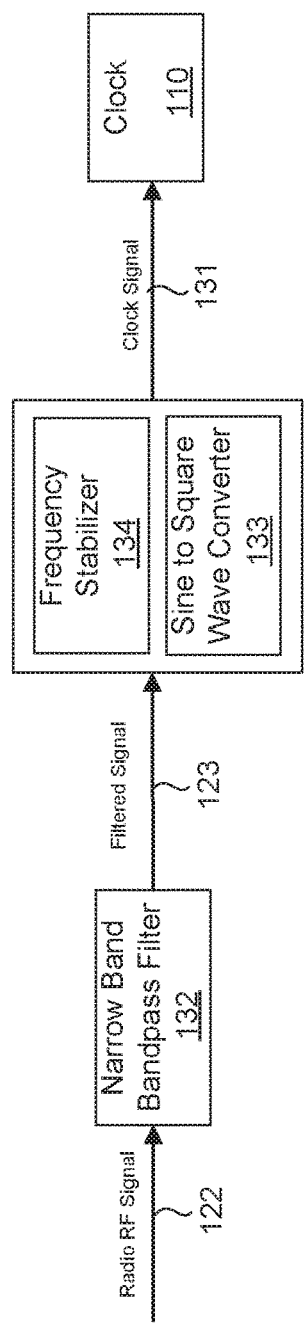
FIG. 6 is an illustration of a signal processor configuration of the RF clocked device of FIG. 2, in accordance with an example of the present disclosure.

In another example, shown in FIG. 6, the narrow band bandpass filter 132 can receive the radio RF signal 122 and output a filtered signal 123 to the frequency stabilizer 134 and the sine to square wave converter 133, which can be combined into a common component. The combined frequency stabilizer 134 and sine to square wave converter 133 component can output a clock signal 131 to the clock 110. In this example, frequency calibration may not be required based on the quality of the signal and/or the required accuracy of the time provided by the clock 110.

Figure 7:
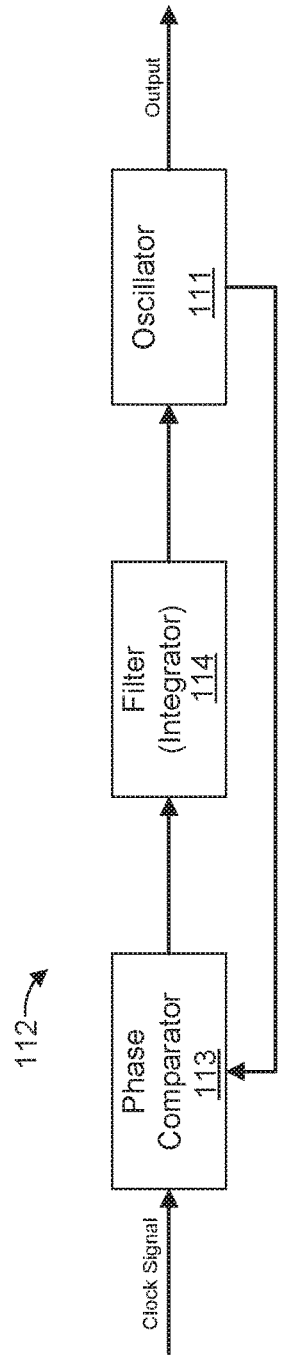
FIG. 7 is an illustration of a phase locked loop used in the RF clocked device of FIG. 2, in accordance with an example of the present disclosure.

In one example, the clock 110 can include an oscillator 111 (e.g., a quartz crystal), as typically found in clocks. The clock 110 can operate using the clock signal 131 by synchronizing the oscillator 111 with the clock signal 131. If the clock 110 begins to drift, it can be adjusted (e.g., forward or backward) to maintain synchronization with the frequency-based time reference provided by the clock signal 131. In one aspect, the adjustment mechanism for the clock 110 can use classic phase locked loop techniques. A phase locked loop 112 is shown conceptually in FIG. 7, where the relatively inaccurate local oscillator 111 in the clock 110 can be phase-locked and synchronized to the precision reference of the clock signal 131 via a phase comparator 113 and filter 114 (e.g., an integrator). In one aspect, the clock can use the clock signal 131 to provide accurate time updates (e.g., the time and/or date 115) on the second increment, which results in a 1 Hz signal. In other words, the clock 110 can provide second updates with an accurate 1 Hz signal derived from the RF signal 104.

In another example, the clock 110 may not include an oscillator (such as the oscillator 111) and instead may operate using the clock signal 131 as a timing mechanism without relying on an oscillator for this function (e.g., by using the clock frequency as an "oscillator frequency" or basis for timing the clock 110).

In one aspect, illustrated in FIGS. 1 and 2, the RF docked device 101 can be configured to adjust the time of the clock 110 with a leap second as applied to Universal Time Coordinated (UTC) time in order to compensate for the slowing of the Earth's rotation. For example, the RF clocked device 101 can be configured to acquire the time and day of the next leap second 108 via the Internet (e.g., via a network connection) and make the leap second adjustment at the proper time. This can ensure that the timing information 103 provided by the RF clocked device 101 is correct regardless of whether the reference timing information 106 is available from the time standard 107. The leap second adjustment can be omitted if the client device 102 does not require it (e.g., if the client device makes the leap second adjustment).

In one aspect, shown in FIG. 2, the clock 110 can output a time and/or a date 115, which can be formatted for transmission to the client device 102. For example, the RF clocked device 101 can include a timing information encoder 140 that receives the time and/or date 115, which is encoded and output as timing information 103 for use by the client device 102. The timing information encoder 140 can encode the time and/or date 115 into any suitable format, such as any standardized format known in the art, and the client device 102 can be operable to receive the timing information 103 in such a format. In one example, the timing information encoder 140 comprises an Inter-Range Instrumentation Group (IRIG) standard format encoder, such as standard IRIG-B format with IEEE-1344 extensions.

Figure 8:
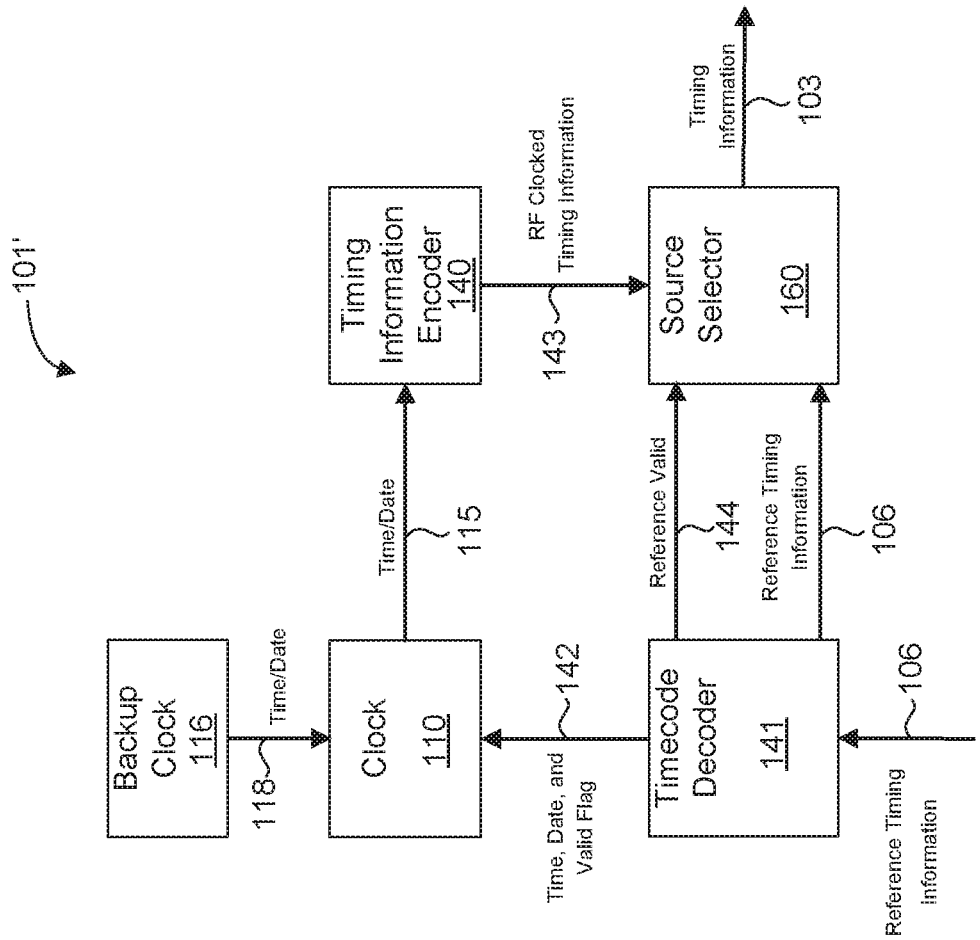
FIG. 8 illustrates a portion of a radio frequency (RF) clocked device in accordance with another example of the present disclosure.

In an alternative example, an RF clocked device 101'(a portion of which is shown in FIG. 8) can be configured to enable pass-through of the reference timing information 106 as the timing information 103 to the client device 102 while the reference timing information 106 is available. The RF clocked device 101' is similar to the RF clocked device 101 of FIG. 2 except for certain components or elements shown in FIG. 8. The same reference numbers have been used to identify the same components or elements in the examples of FIGS. 2 and 8. In the FIG. 8 example, the RF clocked device 101' includes a source selector 160 that serves as a switch to select either the reference timing information 106 or the RF clocked timing information 143 as the timing information 103 to the client device 102. The timecode decoder 141 provides data validity information 144 to the source selector 160. Under normal operation when the reference timing information 106 is available, the source selector 160 selects the reference timing information 106 as the timing information 103 to the client device 102. The source selector 160 monitors the reference valid 144 status of the reference timing information 106 to determine if it should be used or rejected due to a fault (e.g., the reference timing information 106 is unavailable). If there is no valid reference timing information 106 input signal (the reference timing information 106 is unavailable), then the RF clocked timing information 143 (e.g., provided by the clock 110) is used as the timing information 103 to the client device 102. The timing information 103 may be derived from the backup clock 116 if there is no valid RF signal 104 present.

Referring again to FIG. 2, in one aspect, the RF clocked device 101 can include at least one of a display and a user interface 150. Any suitable display and/or user interface type or technology known in the art can be utilized. In one example, the display can be a touch screen and can therefore serve as both a display and a user interface. In another example, the user interface can be configured as a graphical user interface that is visible on the display and controlled by a mouse, a keyboard, etc. In another example, the display and user interface are separate and distinct from another.

In one aspect, the display and/or user interface can be configured to enable a user to seek for an RF signal (e.g., search for the strongest signal and switch to that signal). This is useful if the user believes the current channel is not the strongest channel and wants to update the configuration. In another aspect, the display and/or user interface can be configured to enable a user to reset or restart the RF clocked device 101 (e.g., reset/restart the RF clocked device 101 by cancelling current software operations and causing the RF clocked device 101 to update to the strongest available channel). The display can show current status information, which can include the current state of signal acquisition (e.g., GPS time, ATSC time, or Backup RTC time). The RF clocked device 101 can display this information on a screen and/or with lights (e.g., a green LED indicating GPS time, a yellow LED indicating ATSC time, and red LED indicating Backup RTC time).

The various components and elements of the RF clocked device 101 described herein can be implemented in hardware and/or software in any suitable manner known in the art. For example, the RF clocked device 101 can comprise a hardware/software hybrid architecture an all software platform (e.g., executed on a general-purpose computer), or a hardware implementation.

In accordance with one embodiment of the present invention, a method for timing a dock is disclosed. The method can comprise receiving an RF signal having an RF signal frequency. The method can also comprise processing the RF signal and outputting a clock signal having a dock frequency based on the RF signal frequency. The method can further comprise providing the clock signal to a dock. Additionally, the method can comprise operating the dock using the dock signal, the dock outputting at least one of a time and a date. It is noted that no specific order is required in this method, though generally in one embodiment, these method steps can be carried out sequentially.

In one aspect of the method, the dock signal is a pulse train.

In one aspect of the method, the clock comprises an oscillator, and operating the clock using the clock signal comprises synchronizing the oscillator with the clock signal.

In one aspect of the method, the oscillator is synchronized with the clock signal in a phase locked loop.

In one aspect of the method, the phase locked loop comprises a phase comparator and a filter.

In one aspect of the method, the filter comprises an integrator.

In one aspect of the method, the clock comprises a real time clock (RTC).

In one aspect of the method, operating the clock using the clock signal comprises using the clock frequency as an oscillator frequency.

In one aspect, the method comprises receiving, by the clock, reference timing information provided by a time standard, and synchronizing the clock with the time standard.

In one aspect of the method, synchronizing the clock with the time standard occurs at a predetermined time interval.

In one aspect of the method, the predetermined time interval is one second.

In one aspect of the method, the reference timing information is received from the Global Positioning System (GPS).

In one aspect of the method, processing the RF signal comprises filtering the RF signal with a narrow band bandpass filter.

In one aspect of the method, the narrow band bandpass filter comprises at least one of a Butterworth filter and a Chebyshev filter.

In one aspect of the method, processing the RF signal comprises zero crossing detection to convert a sine wave to a square wave.

In one aspect of the method, processing the RF signal comprises frequency stabilization.

In one aspect of the method, frequency stabilization comprises a phase locked loop.

In one aspect of the method, frequency stabilization comprises a frequency multiplier.

In one aspect of the method, processing the RF signal comprises frequency calibration.

In one aspect of the method, frequency calibration comprises offset compensation.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A radio frequency (RF) clocked device, comprising:
   a signal processor operable to receive an external RF signal having an RF signal frequency and output a clock signal having a clock frequency based on the RF signal frequency;
   a clock operable to receive, and operate, using the clock signal, the clock outputting at least one of a time and a date, wherein the clock is operable to receive reference timing information provided by a time standard for synchronizing the clock with the time standard; and
   a backup clock operable to provide at least one of an initial time and date to the clock upon startup of the RF clocked device in the absence of timing information from the time standard.

2. The RF clocked device of claim 1, wherein the clock signal is a pulse train.

3. The RF clocked device of claim 1, wherein the clock comprises an oscillator, and the clock operates using the clock signal by synchronizing the oscillator with the clock signal.

4. The RF clocked device of claim 3, wherein the oscillator is synchronized with the clock signal in a phase locked loop.

5. The RF clocked device of claim 4, wherein the phase locked loop comprises a phase comparator and a filter.

6. The RF clocked device of claim 5, wherein the filter comprises an integrator.

7. The RF clocked device of claim 1, wherein the clock comprises a real time clock (RTC).

8. The RF clocked device of claim 1, wherein the clock operates using the clock signal by using the clock frequency as an oscillator frequency.

9. The RF clocked device of claim 1, further comprising a timecode decoder for decoding the reference timing information from a standardized format.

10. The RF clocked device of claim 9, wherein the timecode decoder comprises an Inter-Range Instrumentation Group (IRIG) standard format decoder.

11. The RF clocked device of claim 1, further comprising a timing information encoder operable to encode the at least one of the time and the date into timing information in a standardized format.

12. The RF clocked device of claim 11, wherein the timing information encoder comprises an Inter-Range Instrumentation Group (IRIG) standard format encoder.

13. The RF clocked device of claim 1, wherein the signal processor comprises a narrow band bandpass filter.

14. The RF clocked device of claim 13, wherein the narrow band bandpass filter comprises at least one of a Butterworth filter and a Chebyshev filter.

15. The RF clocked device of claim 1, wherein the signal processor comprises zero crossing detection to convert a sine wave to a square wave.

16. The RF clocked device of claim 1, wherein the signal processor comprises a frequency stabilizer.

17. The RF clocked device of claim 16, wherein the frequency stabilizer comprises a phase locked loop.

18. The RF clocked device of claim 1, wherein the signal processor comprises a frequency calibrator.

19. The RF clocked device of claim 18, wherein the frequency calibrator comprises offset compensation.

20. The RF clocked device of claim 1, further comprising a radio receiver operable to receive a wireless transmission of the RF signal for use by the RF clocked device.

21. The RF clocked device of claim 20, wherein the radio receiver comprises a software defined radio (SDR).

22. The RF clocked device of claim 20, further comprising an antenna operable with the radio receiver.

23. The RF clocked device of claim 1, further comprising at least one of a display and a user interface.

24. A clock system, comprising:
   an RF clocked device comprising
      a signal processor operable to receive an external RF signal having an RF signal frequency and output a clock signal having a clock frequency based on the RF signal frequency,
      a clock operable to receive, and operate, using the clock signal, the clock outputting at least one of a time and a date, wherein the clock is operable to receive reference timing information provided by a time standard for synchronizing the clock with the time standard, and
      a backup clock operable to provide at least one of an initial time and date to the clock upon startup of the RF clocked device in the absence of timing information from the time standard; and
   a client device operable to receive timing information from the RF clocked device.

25. The system of claim 24, further comprising a timecode decoder for decoding the reference timing information from a standardized format.

26. The system of claim 25, wherein the timecode decoder comprises an Inter-Range Instrumentation Group (IRIG) standard format decoder.

27. The system of claim 24, wherein the reference timing information is provided by the Global Positioning System (GPS).

28. The system of claim 24, further comprising a timing information encoder operable to encode the at least one of the time and the date into timing information in a standardized format, the client device being operable to receive the timing information in the standardized format.

29. The system of claim 28, wherein the timing information encoder comprises an Inter-Range Instrumentation Group (IRIG) standard format encoder.

30. A method for timing a clock, comprising:
  receiving at least one of an initial time and date from a backup clock upon startup of an RF clocked device in the absence of timing information from a time standard;
  receiving an external RF signal having an RF signal frequency;
  processing the RF signal and outputting a clock signal having a clock frequency based on the RF signal frequency;
  providing the clock signal to a clock; and
  operating the clock using the clock signal, the clock outputting at least one of a time and a date.

31. The method of claim 30, wherein the clock signal is a pulse train.

32. The method of claim 30, wherein the clock comprises an oscillator, and operating the clock using the clock signal comprises synchronizing the oscillator with the clock signal.

33. The method of claim 32, wherein the oscillator is synchronized with the clock signal in a phase locked loop.

34. The method of claim 33, wherein the phase locked loop comprises a phase comparator and a filter.

35. The method of claim 34, wherein the filter comprises an integrator.

36. The method of claim 30, wherein the clock comprises a real time clock (RTC).

37. The method of claim 30, wherein operating the clock using the clock signal comprises using the clock frequency as an oscillator frequency.

38. The method of claim 30, further comprising:
  receiving, by the clock, the reference timing information provided by the time standard; and
  synchronizing the clock with the time standard.

39. The method of claim 38, wherein synchronizing the clock with the time standard occurs at a predetermined time interval.

40. The method of claim 39, wherein the predetermined time interval is one second.

41. The method of claim 38, wherein the reference timing information is received from the Global Positioning System (GPS).

42. The method of claim 30, wherein processing the RF signal comprises filtering the RF signal with a narrow band bandpass filter.

43. The method of claim 42, wherein the narrow band bandpass filter comprises at least one of a Butterworth filter and a Chebyshev filter.

44. The method of claim 30, wherein processing the RF signal comprises zero crossing detection to convert a sine wave to a square wave.

45. The method of claim 30, wherein processing the RF signal comprises frequency stabilization.

46. The method of claim 45, wherein frequency stabilization comprises a phase locked loop.

47. The method of claim 30, wherein processing the RF signal comprises frequency calibration.

48. The method of claim 47, wherein frequency calibration comprises offset compensation.

* * * * *